Aug. 7, 1945.  I. F. CHURCHILL  2,381,039
MULTIPLE DRILLING MACHINE
Filed June 10, 1944  3 Sheets-Sheet 1
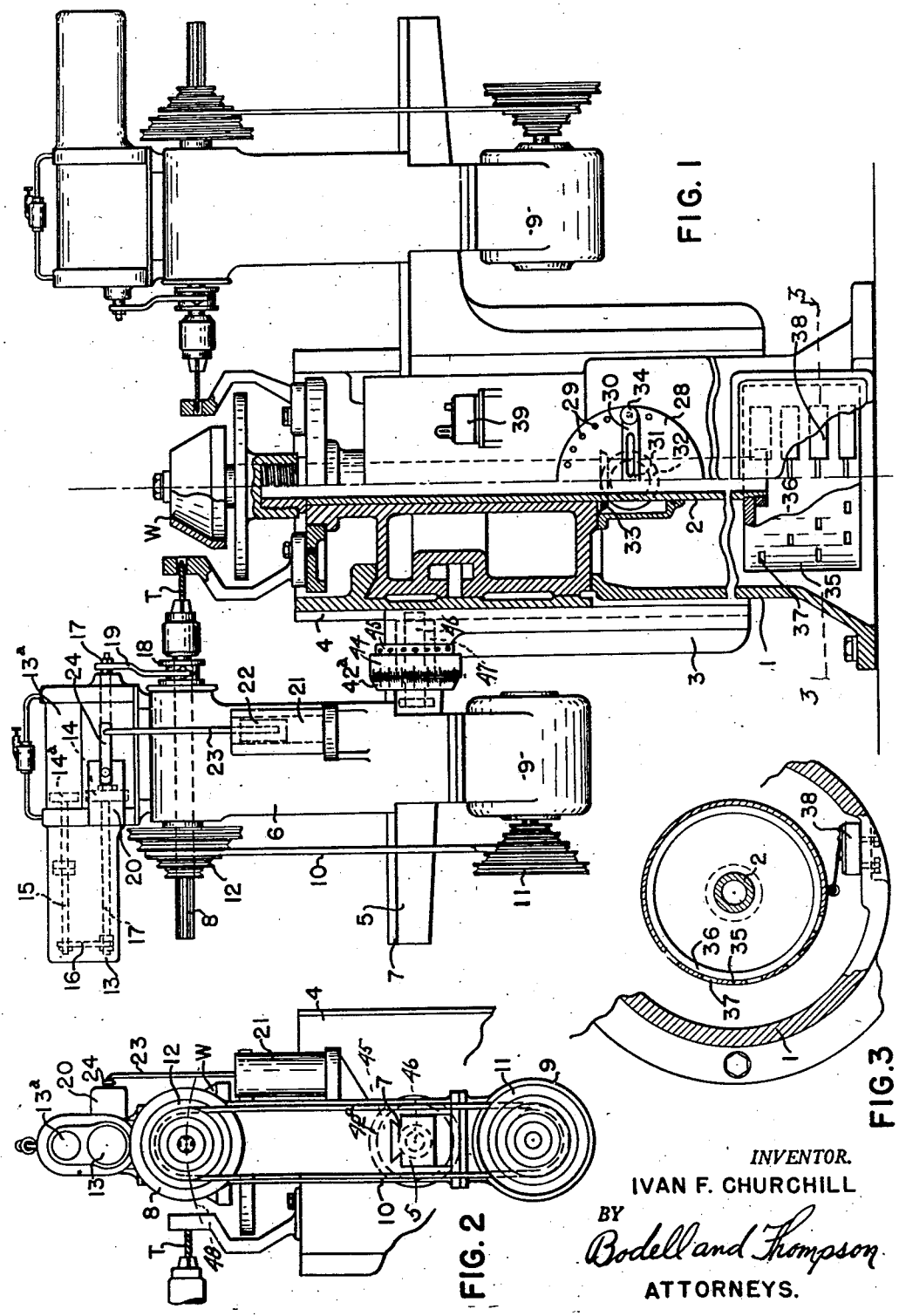
INVENTOR.
IVAN F. CHURCHILL
BY
Bodell and Thompson
ATTORNEYS.

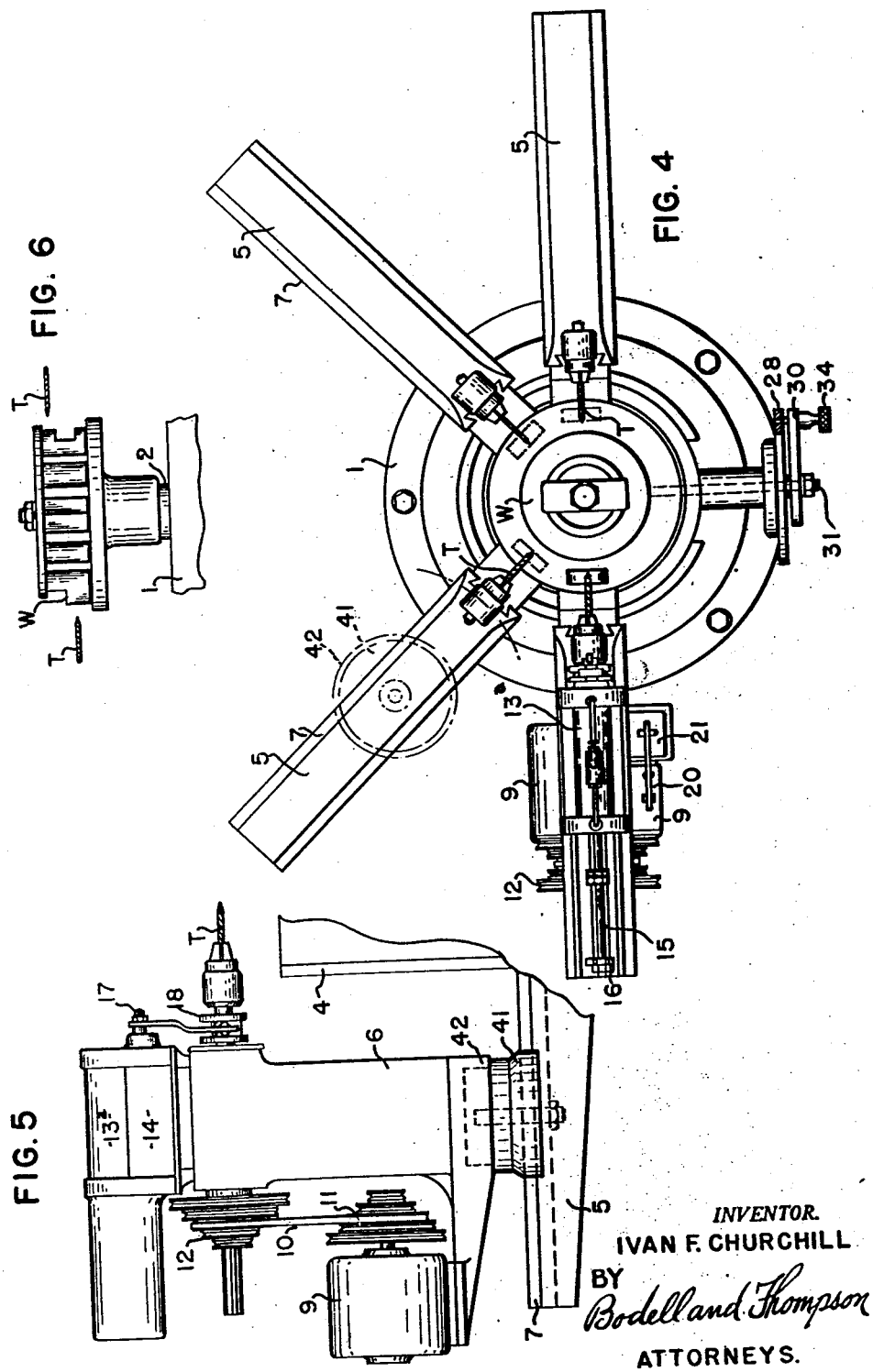

Aug. 7, 1945.  I. F. CHURCHILL  2,381,039
MULTIPLE DRILLING MACHINE
Filed June 10, 1944  3 Sheets-Sheet 3
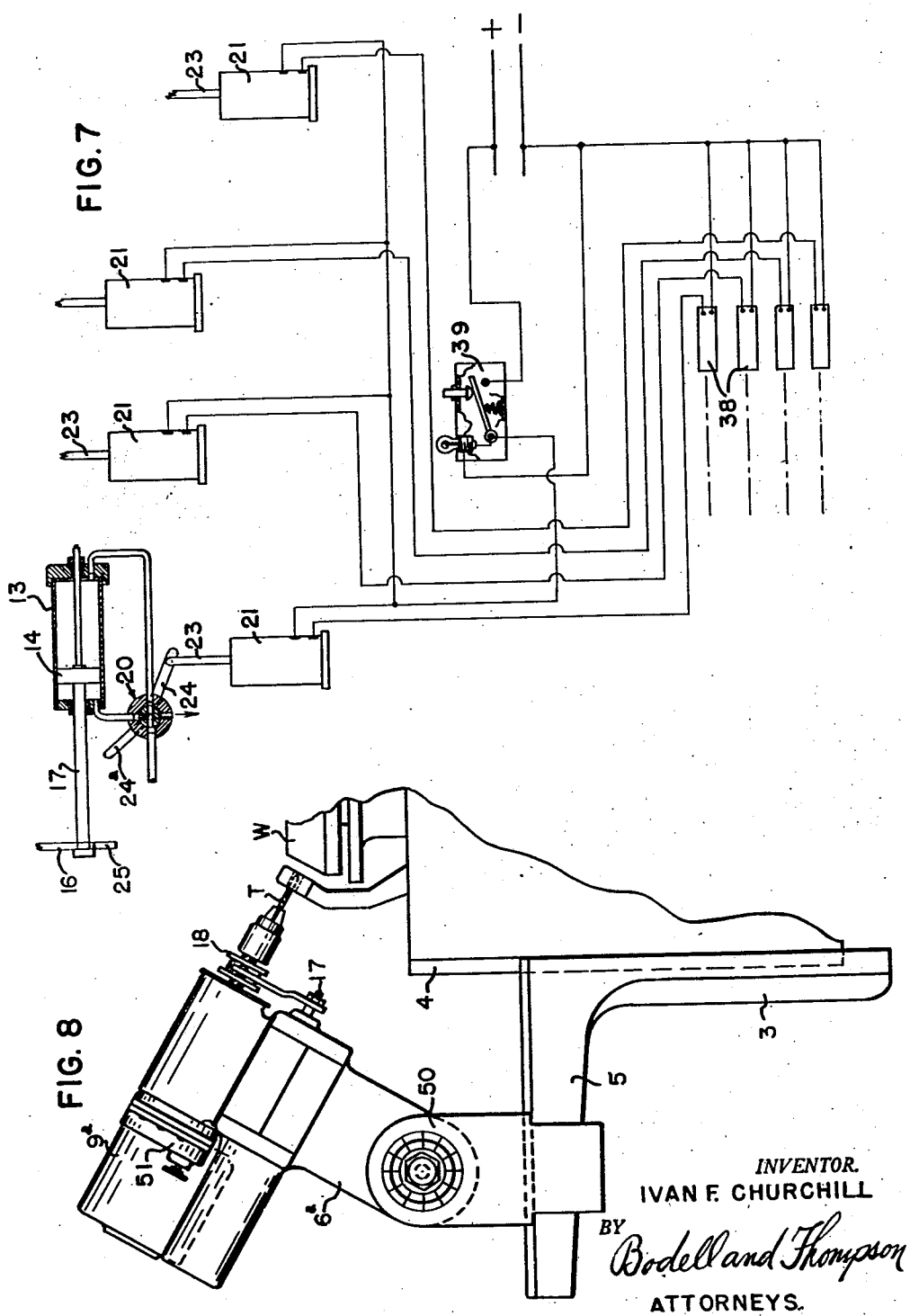
INVENTOR.
IVAN F. CHURCHILL
BY Bodell and Thompson
ATTORNEYS.

Patented Aug. 7, 1945

2,381,039

UNITED STATES PATENT OFFICE 2,381,039

MULTIPLE DRILLING MACHINE

Ivan F. Churchill, Fayetteville, N. Y.

Application June 10, 1944, Serial No. 539,694

2 Claims. (Cl. 77—26)

This invention relates to multiple or universal drilling machines and has for its object a control for the drill or tool mechanisms by which the drills or tools are automatically selected in a predetermined order, and one or more operated at the same time in accordance with the selection, so that the holes drilled in the article may have a certain pattern or location, and more specifically a control by which the operation of the drills or tools is controlled by a timer or formula element or sheet, which is readily prepared for a particular arrangement or pattern of holes.

Other objects appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is an elevation, partly in section, of one form of multiple drill embodying this invention.

Figure 2 is a fragmentary elevation looking to the right in Figure 1.

Figure 3 is a sectional view taken approximately on the plane of line 3—3, Figure 1.

Figure 4 is a fragmentary plan view, partly in section, looking downwardly in Figure 1, parts being omitted.

Figure 5 is a fragmentary elevation of the tool carriage and contiguous parts showing the tool carriage mounted so as to have a universal adjusting movement into different angular positions in a horizontal plane and different inclined angular positions.

Figure 6 is a fragmentary elevation illustrating the operation on a different form of workpiece from that shown in Figure 1.

Figure 7 is a diagrammatic view of the wiring diagram between the formula element and the electro-responsive actuators for controlling the feeding in of the spindles.

Figure 8 is a fragmentary elevation illustrating another form of a drilling head making possible angular drilling of a work-piece from horizontal to vertical.

This universal drilling machine includes, generally, a suitable frame, a work support rotatably mounted in the frame to have an indexing movement about it axis, a plurality of tool carriages spaced apart around the axis of the work support, tool spindles mounted therein and having a feeding or axial shifting movement to carry the tools into and out of the work, means, as motors, one for each spindle, for rotating the spindle, means individual to the spindles for shifting them axially, work indexing mechanism and mechanism controlled by the operation of the indexing mechanism or by the indexing operation to select a predetermined spindle or spindles and control the operation of the axial shifting means therefor.

I designates the frame, this being shown as an upright or hollow standard. 2 designates the work support usually a shaft rotatably mounted in upright position in suitable bearings in the frame I and having means at its upper end for supporting a work-piece W. 3 designates carriages mounted on the outer upright sides of the frame and adjustable vertically thereof along ways 4 or dove-tail guides on the frame, the carriages being held at any elevation in any suitable manner. Each of the carriages 3 includes a horizontal or table portion 5.

6 designates tool carriages movable along suitable interfitting or dove-tail guides 7 on the tables toward and from the shaft 2 or the workpiece thereon, the carriages being held in any position on the tables 5 in any suitable manner. These carriages extend upwardly above the table and are provided with depedning portions below the table.

8 designates spindles mountable in suitable bearings in the carriages 6, these being mounted to shift axially to feed the tools T into and out of the work W. The spindles are individually operable, and while the machine is in operation, preferably rotate continuously. They are here shown as actuated by electric motors 9, one for each spindle, and belts 10 running over pulleys 11 and 12 on the motor shafts and on the spindles respectively. The pulleys 12 are slidably splined on the spindles 8 to permit the axial shifting or feeding movement of the spindles 8 relatively thereto. The means for shifting each of the spindles axially comprises a pressure-operated motor, as a reciprocating cylinder and piston motor operated by a pressure fluid, preferably air, the movable member or piston being connected to the companion spindle. There is one cylinder and piston motor for each spindle 8. 13 designates the cylinder; 14 the piston therein having its rod 15 extending parallel to the spindle 8 and connected by a cross-head 16 to a rod 17 which is connected to a grooved collar 18 on the spindle, by a fork 19. The piston is double acting. The energization of the cylinder and piston motor is controlled by a control member, which in the case of an air motor is a valve, and preferably a reversing valve 20, as the piston is double acting. The reversing valve may be of any well known construction. It is normally at the start arranged in a neutral or cut-off position for one end of the cylinder, as the outer end, and in open-intake position for the other or inner end, and is moved from the normal starting position to open position to effect the feeding in of the spindle by power means, and preferably electro-responsive means, the energization of which is controlled automatically by a formula element or sheet, which in turn is controlled in its operation by the indexing mechanism to be described. A dash pot 13ª wherein a piston 14ª controls the checking of the tool T as it approaches the work W.

The electro-responsive devices are here shown as solenoids 21, the cores 22 of which thrust against stems or push rods 23 connected to the operating levers 24 of the reversing valves 20 respectively. When the solenoids are energized or cut into a closed circuit, as will be presently described, the cores 22 push the rods 23 upwardly, moving the control valve from its starting position into position to open the outer end of the cylinder to the intake of air and open the inner end of the cylinder to the exhaust of air, and hence the piston to move the corresponding tool spindle into the work. When the tooling or drilling operation is completed, that is, when the drill or tool has cut into the work the desired depth, a shoulder 25 on the rod 17 encounters the valve lever 24ª and reverses the valve to let air into the inner end of the cylinder 13 and the air to exhaust from the outer end to return the piston to starting position and hold the same in its position until the companion cylinder is again energized. The solenoids 21 are but momentarily energized long enough to effect operation of the valve, and when de-energized after operating the valve lever 24ª, the core 22 of the solenoid 21 returns to normal position. When the solenoid is de-energized, its core is spaced apart from the lower end of the push rod 23. The reversing valve may be of any conventional construction.

The indexing mechanism includes a disk or plate 28 having holes 29 therein corresponding to the holes to be bored or drilled by the tools T, and a handle or lever 30 mounted on a shaft 31 coaxial with the disk and having a bevel gear 32 thereon meshing with a bevel gear 33 on the work supporting shaft 2. The lever has a suitable knob 34 provided with a pin for insertion in the holes 29 successively. When this knob is operated to pull the pin out its hole, turn the arm 30 and let the pin enter another hole, the work shaft 2 is rotated or indexed. Different index plates 28 are used for different arrangements of the holes to be drilled or tooled.

The mechanism controlled by the operation of the indexing mechanism to select the spindle controlling the operation of the axial shifting means of the selected spindle, that is, controlling the operation of electro-responsive means or solenoids 21 in this embodiment of the invention, includes a formula element or sheet 35 operable during the operation of the indexing mechanism and in accordance with the indexing mechanism, here shown as mounted on a support 36 which is mounted directly on the work supporting shaft 2 at the lower end thereof within the base of the frame 1. This formula element 35 is preferably a sheet provided with active portions by forming depressions, perforations or slots 37 therein (Figure 3), one perforation for each tool, the perforations being arranged to render the tools active in accordance with the predetermined location of the holes to be bored. The support 36 for the sheet 35 is here shown as a drum.

As the actuators for the control members or reversing valves are electro-responsive, the formula element or sheet operates switches in circuits connected to the windings of the solenoids, one circuit for each solenoid. 38 designate switches, these being extremely sensitive or micro-switches. As here shown, there are four tools and hence four switches and solenoids 21 and four circumferential rows of slots 37. The switches 38 are connected to the solenoids respectively by separate wires but through a master manually operated switch 39 common to all the circuits, suitably mounted on the frame of the machine, the connections being the micro-switches and the solenoids through the master switch being clearly shown in Figure 7.

With the work-piece in place and the tool carriage properly adjusted or the machine set up for a particular piece of work, the operator closes the switch 39, whereupon the circuits to one or more of the solenoids 21 are closed, depending upon whether the corresponding micro-switch 38 is in register with a slot 37. The circuits of the micro-switches not in register with a slot 37 are dead. However, the solenoids in the live circuits are actuated, operating the control valve or valves, and permitting the air to pass into the companion cylinders at the outer ends thereof to actuate their pistons and carry the companion tools into the work. At the end of the feeding-in operation, the control valve is reversed permitting the piston to withdraw the tools out of the work to starting position. The operator then indexes by operating the indexing lever 30, thus also shifting or indexing the formula element 35 and then again closes the switch 39, whereupon the operation is repeated with the same or different tools or with all the tools in accordance with the arrangement of the slots in the formula sheet relative to the transverse lines of the formula sheet. If all four set of slots 37 are in transverse alinement, then all four tools will be operated simultaneously.

In Figure 1, the work-piece W is shown as conical, the peripheral surface of which is to be formed with holes arranged in a predetermined manner. The slots in the formula sheet are cut to control the operation of the tools to drill the holes in the work in a predetermined position. In Figures 1 and 4, the tools are shown as arranged to drill radially into the work-piece. In Figure 6, a slightly different form of work-piece is shown. In some work, the holes may not be drilled radially, and also not in a horizontal plane, but in a plane more or less out of the horizontal or approaching the vertical, as indicated at A (Figure 8). For this purpose, the carriage 6, as shown in Figure 5, may be mounted on a base piece 41 by a joint 42 capable of having a universal movement, that is, a swivelling movement and also a tilting movement. However, with such a joint, the motor and solenoids remain a unit with the carriage 6 to partake of the movements thereof, and the piping for the cylinder 13 is flexible to accommodate these adjustments. Also, in making such adjustment, the carriages 3 and 6 may be adjusted vertically and horizontally respectively along the ways 4 and 7.

To further vary the angle of the tool or drill, each carriage 6 may be mounted to swing in an arc about an axis radial to the axis of the work carriage or spindle 2. As seen in Figures 1 and 2, this is effected by tilting the table 5 about such horizontal axis relatively to the main body of the vertically adjustable carriage 3. As here shown, this adjusting means includes a collar 42ª fixed to the table and having a scale thereon complemental to a scale on a similar collar 44 on the carriage 3. The collar 44 is slidable axially but not rotatable. It is shiftable axially to clamp against the collar 42ª by means of a nut 45 threading on the carriage or the hub of the carriage in which is located a stud 46 mounted in the hub 47 of the carriage on which the collar 44 and nut 45 are mounted, the carriage 5 being mounted on the stud to have an arcuate movement illustrated by the arc 48 (Figure 2). By loosening the nut 45, the table 2 may be turned in an arc carrying the carriage 6 therewith, the amount of this arcuate or angular adjustment being determined by a comparison of the scales on the collars 42ª and 44. When the adjustment is completed, the nut 45 is again tightened.

By this timer or formula sheet control, a plurality of holes in a certain predetermined arranged pattern can be quickly drilled in a workpiece and the formula sheet readily prepared for any desired pattern.

The indexing mechanism is preferably manually operated but may be automatically operated, and also a switch corresponding to the switch 39 may be automatically operated at the end of each operation. It is preferable, however, to have an attendant at the machine, as no appreciable time is lost in the manual operation.

In Figure 8, the tool carriage 6ª is shown as mounted to tilt about a horizontal axis to adjust the tool at inclined angles out of the horizontal. Each carriage is connected to a base adjustable along the table 5. The pivotal joint of the carriage 6ª is designated 50. It may be of any conventional mechanical construction. When the tilting carriage 6ª is used, the motor 9ª is mounted on the carriage 6ª near the tool spindle and the power transferred to the spindle through any well known form of speed reducer 51 instead of the belt arrangement illustrated in Figures 1 and 2.

What I claim is:

1. In a universal drilling machine, the combination with a work support indexible about an axis, a plurality of carriages, tool spindles rotatably mounted in the carriages and shiftable axially therein to feed the tools radially relatively to the axis of the work support into and out of the work, means for rotating each of the spindles individually, means for shifting each of the spindles axially including a reversible motor, one motor for each spindle, and a control member for each motor, and mechanism operable to index the work about its axis; of a formula element, connections between the indexing mechanism and the formula element to shift the latter during each indexing operation, the formula element having rows of active portions arranged to be brought successively into operating position during the indexing operation, the active portions of each row being arranged in accordance with the pattern of holes to be drilled by the tools, and shiftable members, one for each reversible motor control member, located to coact with the active portions, respectively, of the rows of the formula element, to be actuated thereby when the active portions come in register with the shiftable members, an actuator for each reversible motor control member, and connections between each shiftable member and the actuator for the control members respectively for controlling the operation of the control members.

2. In a universal drilling machine, the combination with a work support indexible about an axis, a plurality of carriages, tool spindles rotatably mounted in the carriages and shiftable axially therein to feed the tools radially relatively to the axis of the work support into and out of the work, means for rotating each of the spindles individually, means for shifting each of the spindles axially including a reversible motor, one motor for each spindle, and a control member for each motor, and mechanism operable to index the work about its axis; of an electro-responsive actuator for each reversible motor control member, an electric circuit having branches to each electro-responsive actuator, a normally open switch in each branch, a formula element for controlling the closing of the switches, and connections between the indexing mechanism and the formula element to shift the latter during each indexing operation, the formula element having rows of active portions arranged to be brought successively, during the indexing operation, into position to close one or more of the switches.

IVAN F. CHURCHILL.